(12) United States Patent
Usuda et al.

(10) Patent No.: US 8,189,505 B2
(45) Date of Patent: May 29, 2012

(54) TRANSMISSION POWER CONTROL METHOD AND MOBILE STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 686 days.

(21) Appl. No.: 11/909,949

(22) PCT Filed: Mar. 29, 2006

(86) PCT No.: PCT/JP2006/306536
§ 371 (c)(1),
(2), (4) Date: Sep. 27, 2007

(87) PCT Pub. No.: WO2006/104208
PCT Pub. Date: Oct. 5, 2006

(65) Prior Publication Data
US 2008/0069075 A1 Mar. 20, 2008

(30) Foreign Application Priority Data
Mar. 29, 2005 (JP) .................................. 2005-127061

(51) Int. Cl.
*H04B 7/185* (2006.01)
*H04B 7/00* (2006.01)
(52) U.S. Cl. ........................................ 370/318; 455/522
(58) Field of Classification Search .................... None
See application file for complete search history.

(56) References Cited

U.S. PATENT DOCUMENTS 7,113,496 B2 * 9/2006 Koo et al. ...................... 370/335
7,454,215 B2 * 11/2008 Hamano et al. ................ 455/455
7,773,562 B2 * 8/2010 Grieco .......................... 370/331

(Continued)

FOREIGN PATENT DOCUMENTS
JP 2001-136123 5/2001
(Continued)

OTHER PUBLICATIONS

TSG-RAN Working Group 2#44, R2-042010, "Outer Loop Transmission Power Control in Enhanced Uplink", NEC, Sophia Antipolis, France, Oct. 4-8, 2004, 3 pages.

*Primary Examiner* — Hassan Phillips
*Assistant Examiner* — Eunsook Choi
(74) *Attorney, Agent, or Firm* — Marvin A. Motsenbocker; MOTS Law, PLLC (57) ABSTRACT

The present invention avoids deterioration in the radio quality caused by a transmission interruption of uplink user data, by periodically controlling an outer loop transmission power. A transmission power control method according to the present invention includes: determining, at a radio network controller RNC, a transmission period and notifying the determined transmission period to a mobile station UE; transmitting, at the mobile station UE, an outer loop control signal in the determined transmission period through a data channel, even when uplink user data to be transmitted through the data channel does not exist; measuring, at a radio base station Node B, a reception quality of the data channel and determining the measurement result to the radio network controller RNC; determining, at the radio network controller RNC, the transmission offset of the data channel based on the measurement result and notifying the determined transmission power offset to the mobile station UE; and controlling, at the mobile station UE, the transmission power of the uplink user data to be transmitted through the data channel by using the transmission power offset.

8 Claims, 6 Drawing Sheets

U.S. PATENT DOCUMENTS

| | | | |
|---|---|---|---|
| 2003/0076799 A1* | 4/2003 | Kwak et al. | 370/335 |
| 2004/0106423 A1* | 6/2004 | McGowan et al. | 455/522 |
| 2004/0162099 A1* | 8/2004 | Chen et al. | 455/522 |
| 2004/0203993 A1* | 10/2004 | Tanoue | 455/522 |
| 2004/0248608 A1* | 12/2004 | Kobayashi | 455/522 |
| 2005/0003848 A1* | 1/2005 | Chen et al. | 455/522 |
| 2005/0083869 A1* | 4/2005 | Takahashi et al. | 370/318 |
| 2006/0073791 A1* | 4/2006 | Senarath et al. | 455/67.13 |
| 2006/0203782 A1* | 9/2006 | Kwak et al. | 370/335 |
| 2007/0155388 A1* | 7/2007 | Petrovic et al. | 455/442 |

FOREIGN PATENT DOCUMENTS

| | | |
|---|---|---|
| JP | 2003-318818 | 11/2003 |
| JP | 2004-080531 | 3/2004 |
| JP | 2006-135485 | 5/2006 |
| JP | 2006-140650 | 6/2006 |

* cited by examiner

TRANSMISSION POWER CONTROL METHOD AND MOBILE STATION

TECHNICAL FIELD

The present invention relates to a transmission power control method and a mobile station, for controlling a transmission power of uplink control channel at a mobile station.

BACKGROUND ART

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message in a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

Figure 10:
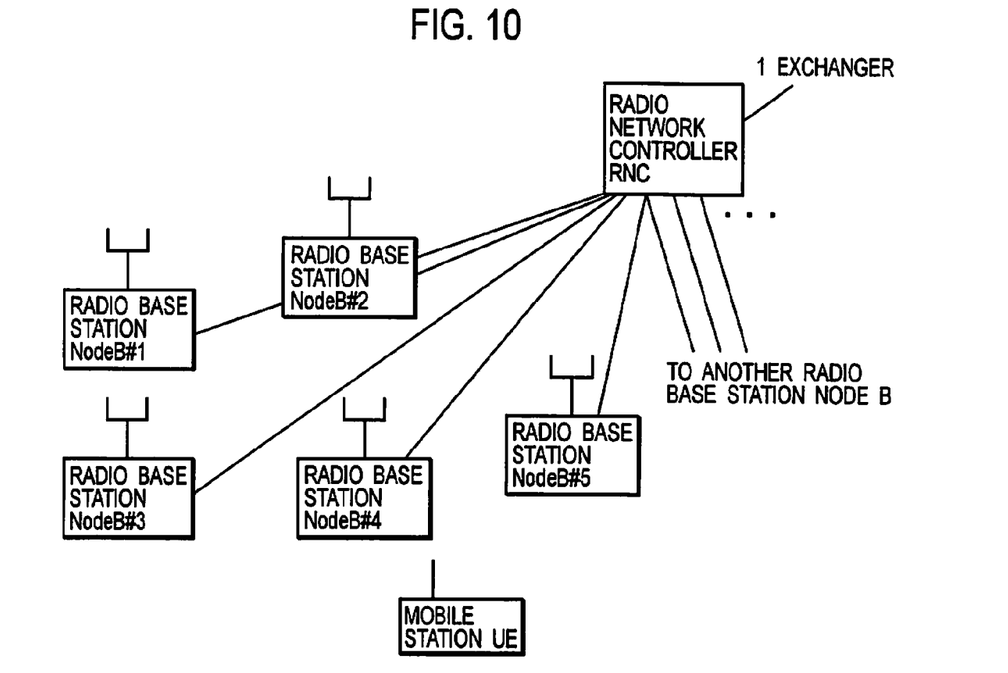
FIG. 10 is a diagram showing an entire configuration of a general mobile communication system.

However, as shown in FIG. 10, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has also been a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 11(a), the data are transmitted by accepting low-speed, high-delay, and low-transmission efficiency as shown in FIG. 11(b), or, as shown in FIG. 11(c), by reserving radio resources for high-speed communications to accept that radio bandwidth resources in an unoccupied state and hardware resources in the radio base station Node B are wasted.

Figure 11:
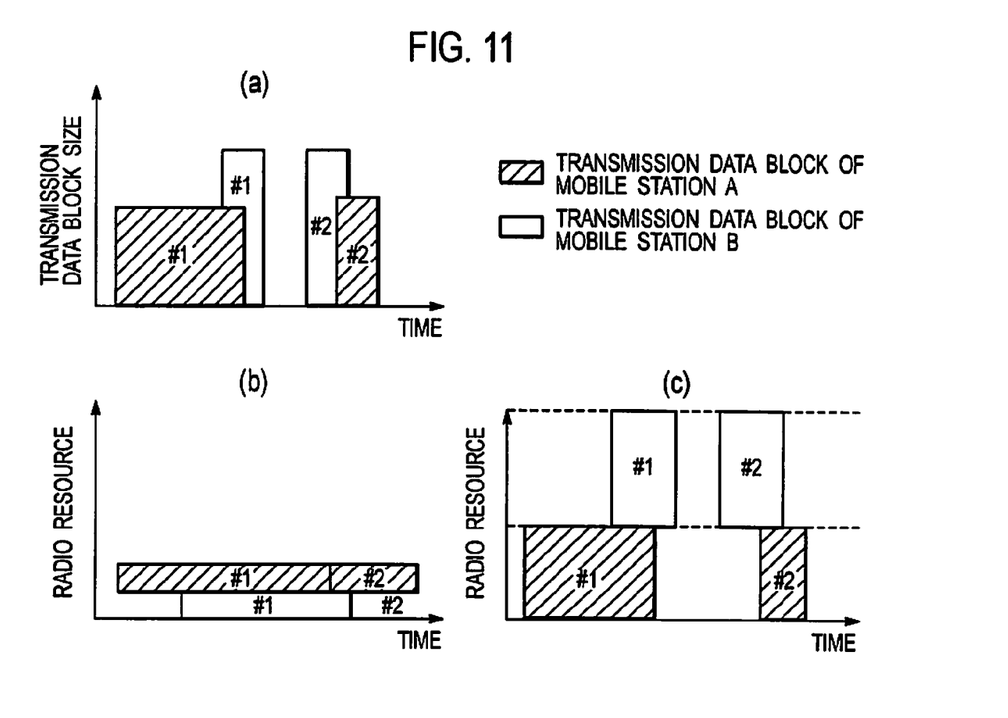

It should be noted that both of the above-described radio bandwidth resources and hardware resources are applied to the vertical radio resources in FIG. 11.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively.

Such discussions or discussed functions will be hereinafter referred to as "Enhanced Uplink (EUL)".

Radio resource control methods that have been discussed in the "Enhanced Uplink" can be broadly categorized into three as follows. The radio resource control methods will be briefly described below.

First, a radio resource control method that is referred to as "Time & Rate Control" has been discussed.

In such a radio resource control method, a radio base station Node B determines a mobile station UE which can transmit user data and a transmission rate of user data per a predetermined timing, so as to notify a mobile station ID as well as the information relating the transmission rate of user data (or a maximum allowable transmission rate of user data).

The mobile station UE designated by the radio base station Node B transmits user data at the designated timing and the transmission rate (or within a range of the maximum allowable transmission rate).

Second, a radio resource control method that is referred to as "Rate Control per UE" has been discussed.

In such a radio resource control method, if user data to be transmitted to the radio base station Node B exists, each mobile station UE can transmit the user data. However, regarding the maximum allowable transmission rate of the user data, the transmission rate determined by the radio base station Node B and notified to each mobile station UE for each transmission frame or each of a plurality of transmission frames, is used.

Here, when the maximum allowable transmission rate is notified, the radio base station Node B notifies the maximum allowable transmission rate itself at the timing, or a relative value thereof (for example, an "Up command", a "Down command", and a "Hold command").

Third, a radio resource control method that is referred to as "Rate Control per Cell" has been discussed.

In such a radio resource control method, a radio base station Node B notifies a transmission rate of user data, which is common among mobile stations UE in communication, or information required to calculate the transmission rate, so that each mobile station UE determines a transmission rate of user data based on the received information.

Ideally, the "Time & Rate Control", and the "Rate Control per UE" can be the best control methods for improving radio capacity in an uplink. However, a transmission rate of user data has to be granted after data volume stored in buffers of the mobile station UE, transmission power in the mobile station UE, or the like are grasped. Therefore, there has been a problem that control load is increased by the radio base station Node B.

In addition, in these radio resource control methods, there has been a problem that overhead becomes larger by exchanges of control signals.

On the other hand, in the "Rate Control per Cell", there is an advantage in that control load by the radio base station Node B is small since the radio base station Node B notifies information which is common in cells, and each mobile station UE autonomously seeks the transmission rate of user data based on the received information.

However, the radio base station Node B has to be configured in such a manner that the user data in the uplink from any mobile station UE can be received. Therefore, there has been a problem that an apparatus size of radio base station Node B becomes large to effectively utilize the radio capacity of the uplink.

Accordingly, there has been proposed, for example, a scheme (Autonomous ramping method) that the mobile station UE increases the transmission rate of user data from a pre-notified initial transmission rate in accordance with pre-determined rules so that excessive allocation of radio capacity by the radio base station Node B can be prevented, thereby preventing increase of the apparatus size of radio base station Node B, as described in Non-patent Document 1.

In such a scheme, a radio base station Node B determines a maximum allowable transmission rate (or a parameter relating to the maximum allowable transmission rate, the same shall apply hereinafter) based on hardware resources or radio bandwidth resources (for example, an interference volume in an uplink) in each cell, so as to control the transmission rate of user data in communicating mobile stations UE. Detailed descriptions of a control scheme based on hardware resources and a control scheme based on an interference volume in an uplink will be given below.

In the control scheme based on the hardware resources, a radio base station Node B is configured to notify a maximum allowable transmission rate to a mobile station UE connected to a cell under the control thereof.

The radio base station Node B lowers the maximum allowable transmission rate so as to avoid shortage of the hardware resources when the transmission rate of user data in the mobile station UE connected to the cell under the control thereof is increased and the hardware resources are insufficient.

On the other hand, the radio base station Node B again increases the maximum allowable transmission rate when the space of the hardware resources becomes larger, such as when the user data transmission in the mobile station UE connected to the cell under the control thereof has been completed, or the like.

In addition, in the control scheme based on the interference volume in the uplink, a radio base station Node B is configured to notify a maximum allowable transmission rate to a mobile station UE connected to a cell under the control thereof.

Figure 12:
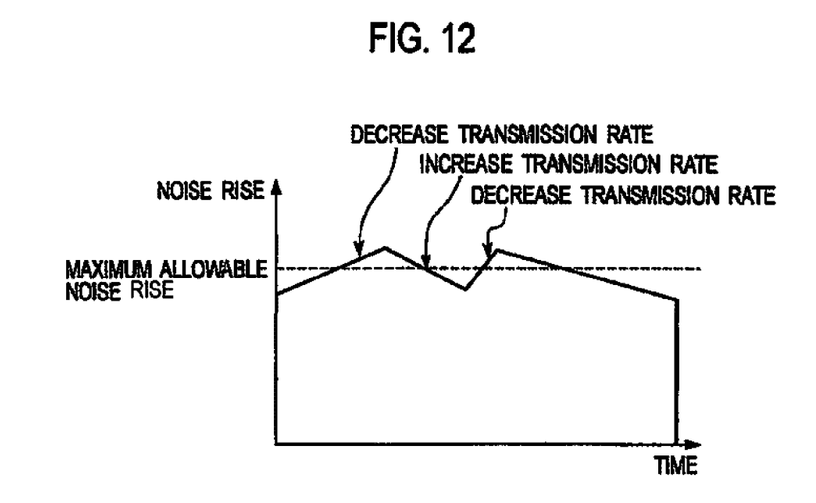
FIG. 12 is a diagram for explaining an operation for controlling transmission rate in uplink in a conventional mobile communication system.

When the transmission rate of user data in the mobile station UE connected to the cell under the control of a radio base station Node B increases and a measured interference volume (for example, a measured noise rise) in the uplink exceeds an allowable value (for example, a maximum allowable noise rise), the radio base station Node B lowers the maximum allowable transmission rate so that the interference volume in the uplink can be within a range of the allowable value (see, FIG. 12).

On the other hand, when the interference volume (for example, the noise rise) in the uplink is within a range of the allowable value (for example, the maximum allowable noise rise) thereby having a space, such as when the user data transmission in the mobile station UE connected to the cell under the control of the radio base station Node B has been completed, or the like, the radio base station Node B again increases the maximum allowable transmission rate (see, FIG. 12).

Figure 13:
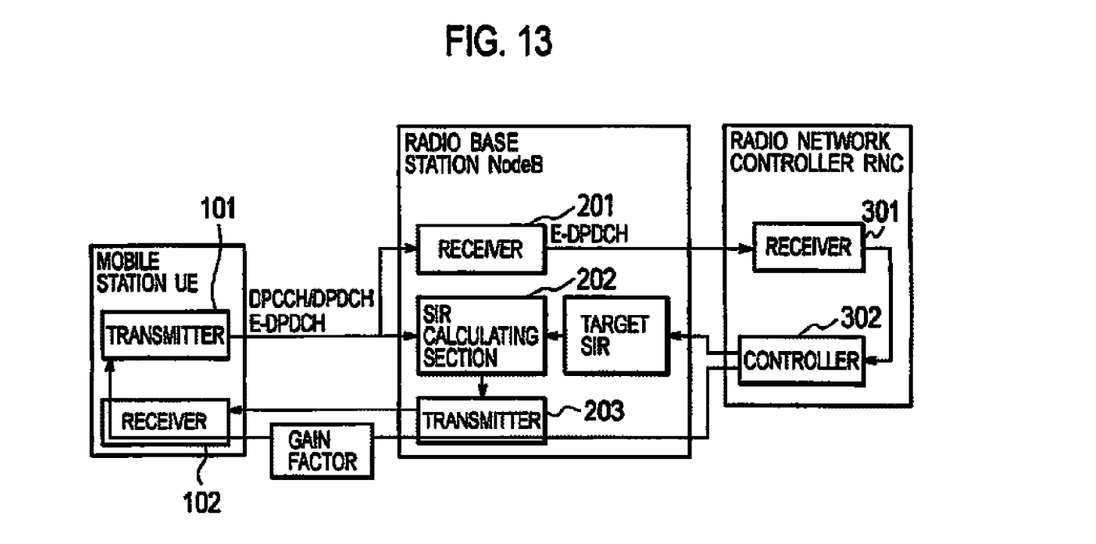
FIG. 13 is a diagram for explaining a transmission power control system in a conventional mobile communication system.

Further, a transmission power control in a mobile communication system using "EUL" will be described with reference to FIG. 13.

A transmitter 101 of the mobile station UE is configured to periodically transmit a Dedicated Physical Control Channel (DPCCH), to which a layer-1 control information such as a pilot signal, a TPC command or the like are mapped.

In addition, the transmitter 101 of the mobile station UE is configured to transmit a Dedicated Physical Data Channel (DPDCH) or an Enhanced Dedicated Physical Data Channel (E-DPDCH), to which the uplink user data or the control information in more than layer 2 are mapped, in accordance with presence or absence of uplink user data to be transmitted, or presence or absence of a transmission opportunity allocation.

An SIR calculating section 202 of the radio base station Node B calculates a reception signal to interference power ratio (a reception SIR) of the control signal received through the DPCH, and compares a set target SIR with the reception SIR.

When the reception SIR is larger than the target SIR, a transmitter 203 of the radio base station Node B transmits a "Down" command to the mobile station UE. When the reception SIR is smaller than the target SIR, the transmitter 203 of the radio base station Node B transmits an "Up" command to the mobile station UE.

A series of operation described above is referred to as an "inner loop transmission power control".

On the other hand, an input section 301 of the radio network controller RNC is configured to measure a reception quality of the E-DPDCH (or the DPDCH).

Then, a controller 302 of the radio network controller RNC is configured to set a target SIR of the radio base station Node B based on the measurement result, and to determine a transmission wave amplitude ratio between the E-DPDCH transmitted from the mobile station UE and the DPCCH (the above transmission amplitude ratio is hereinafter referred to as "gain factor"), so as to notify the determined gain factor to the mobile station UE.

A series of operation described above is referred to as "outer loop transmission power control".

In the conventional mobile communication system using "EUL", "outer loop transmission power control" can be adapted to various fluctuations in radio environment, such as when the mobile station UE shifts to soft handover status, when the transmission rate of the mobile station UE has changed, when the radio waves are interrupted by such as buildings, or the like.

However, if user data to be transmitted through the E-DPDCH does not exist, only "inner loop transmission power control" is performed without "outer loop transmission power control". In such a case, the gain factor or the target SIR cannot be set appropriately in accordance with the propagation environment changing, thereby it is not possible to transmit uplink user data with an appropriate transmission power when the transmission is restarted. This causes a problem of deterioration in the radio quality.

(Non-patent Document 1) 3GPP TSG-RAN R2-042010

DISCLOSURE OF THE INVENTION

The present invention has been made considering the above-described problems, and its object is to provide a transmission power control method and a mobile station that makes it possible to avoid deterioration in the radio quality caused by a transmission interruption of uplink user data, by periodically controlling an outer loop transmission power in a conventional mobile communication system using "EUL".

A first aspect of the present invention is summarized as a transmission power control method for controlling a transmission power of an uplink user data channel at a mobile station, including: determining a transmission period of an outer loop transmission power control signal and notifying the determined transmission period to the mobile station; transmitting, at the mobile station, the outer loop transmission power control signal in the determined transmission period through the uplink user data channel, even when uplink user data to be transmitted through the uplink user data channel does not exist; measuring, at a radio base station, a reception quality of the outer loop transmission power control signal received through the uplink user data channel; controlling, at the radio base station, the transmission power of the uplink user data channel based on the measurement result and a target reception quality; notifying, at the radio base station, the measurement result to a radio network controller; determining, at the radio network controller, a transmission power offset of the uplink user data channel based on the measurement result, and notifying the determined transmission power offset to the mobile station; determining, at the radio network controller, the target reception quality based on the measurement result, and notifying the determined target reception quality to the radio base station; and controlling, at the mobile station, the transmission power of the uplink user data channel by using the transmission power offset.

In the first aspect of the present invention, the radio network controller may determine the transmission period and notifies the determined transmission period to the mobile station.

In the first aspect of the present invention, the radio network controller may determine the transmission period when the mobile station sets a call or when the mobile station starts a soft handover, and notifies the determined transmission period to the mobile station.

In the first aspect of the present invention, the transmission period may be determined in accordance with a status of the mobile station or a congestion degree of a radio network.

A second aspect of the present invention is summarized as a mobile station for transmitting an uplink user data channel, including: an outer loop transmission power control signal transmitter configured to transmit an outer loop transmission power control signal through the uplink user data channel at a predetermined transmission period, even when uplink user data to be transmitted through the uplink user data channel does not exist; and a transmission power controller configured to control a transmission power of the uplink user data channel by using a transmission power offset determined by using the outer loop transmission power control signal.

In the second aspect of the present invention, the predetermined transmission period may be determined by a radio network controller and notified.

In the second aspect of the present invention, the predetermined transmission period may be notified when the mobile station sets a call or when the mobile station starts a soft handover.

A third aspect of the present invention is summarized as a radio network controller used in a transmission power control method for controlling a transmission power of an uplink user data channel at a mobile station, including: a transmission period determining section configured to determine a transmission period for an outer loop transmission power control signal and to notify the determined transmission period to the mobile station; a transmission power offset determining section configured to determine a transmission power offset of the uplink user data channel based on the measurement result of a reception quality of the outer loop transmission power control signal received through the uplink user data channel, the measurement result notified from a radio base station, and to notify the determined transmission power offset to the mobile station; and a target reception quality determining section configured to determine a target reception quality of the uplink user data channel based on the measurement result, and to notify the determined target reception quality to the radio base station.

In the third aspect of the present invention, the transmission period determining section may be configured to determine the transmission period when the mobile station sets a call or when the mobile station starts a soft handover, and to notify the determined transmission period to the mobile station.

In the third aspect of the present invention, the transmission period determining section may be configured to determine the transmission period in accordance with a status of the mobile station or a congestion degree of a radio network, and to notify the determined transmission period to the mobile station.

BRIEF DESCRIPTION OF THE DRAWINGS

FIGS. 11(*a*) to 11 (*c*) are graphs illustrating operations at the time of burst data transmission in a conventional mobile communication system.

BEST MODE FOR CARRYING OUT THE INVENTION

Mobile Communication System According to First Embodiment of the Present Invention A description will be given of a configuration of a mobile communication system according to a first embodiment of the present invention with reference to FIGS. 1 to 9.

It should be noted that, as shown in FIG. 10, the mobile communication system according to this embodiment is provided with a plurality of radio base stations Node B #1 to Node B #5 and a radio network controller RNC.

The mobile communication system according to the present embodiment is configured to raise a transmission rate of user data automatically up to the maximum allowable transmission rate. The transmission rate of user data is transmitted through an uplink by a mobile station UE.

Further, the mobile communication system of the present embodiment may set a transmission rate of user data transmitted from a mobile station through the uplink, as a maximum allowable transmission rate.

In addition, in the mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, an Enhanced Dedicated Physical Channel, configured of an Enhanced Dedicated Physical Data Channel and an Enhanced Dedicated Physical Control Channel, and a Dedicated Physical Channel, configured of a Dedicated Physical Data Channel (DPDCH) and a Dedicated Physical Control Channel (DPCCH), are used in the uplink.

Here, the E-DPCCH transmits control data for the EUL such as a transmission format number for defining a transmission format (transmission block size, or the like) of the E-DPDCH, HARQ related information (the number of retransmissions, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a transmission power control bit in a downlink.

In addition, the DPDCH is paired with the DPCCH, and transmits user data for the mobile station UE based on the control data transmitted through the DPCCH. However, if user data to be transmitted does not exist in the mobile station UE, the DPDCH can be configured not to be transmitted.

In addition, in the uplink, a "High Speed Dedicated Physical Control Channel (HS-DPCCH)", which is required when the HSPDA is applied, is also used.

The HS-DPCCH transmits a Channel Quality Indicator (CQI), which is measured in the downlink, and a transmission acknowledgement signal ("Ack" or "Nack") for the HS-DPCCH.

Figure 1:
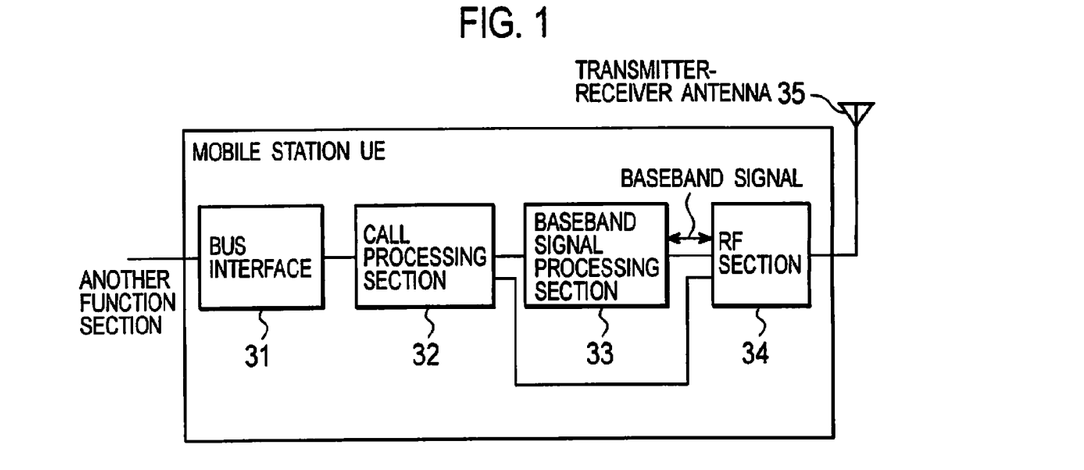
FIG. 1 is a functional block diagram of a mobile station of a mobile communication system according to the first embodiment of the present invention.

As shown in FIG. 1, the mobile station UE according to this embodiment is provided with a bus interface 31, a call processing section 32, a baseband processing section 33, a radio frequency (RF) section 34, and a transmission-reception antenna 35.

However, these functions can be independently present as a hardware, and can be partly or entirely integrated, or can be configured through a process of software.

The bus interface 31 is configured to forward user data output from the call processing section 32 to another functional section (for example, an application related functional section). In addition, the bus interface 31 is configured to forward user data transmitted from another functional section (for example, the application related functional section) to the call processing section 32.

The call processing section 32 is configured to perform a call control processing for transmitting and receiving user data.

The baseband signal processing section 33 is configured to, acquire user data by performing a layer-1 processing including a despreading processing, a RAKE combining processing, and a Forward Error Correction (FEC) decode processing, a Media Access Control (MAC) processing including a MAC-e processing and a MAC-d processing, and a Radio Link Control (RLC) processing, against the baseband signals transmitted from the RF section 34, so as to transmit the acquired user data to the call processing section 32.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

Figure 2:
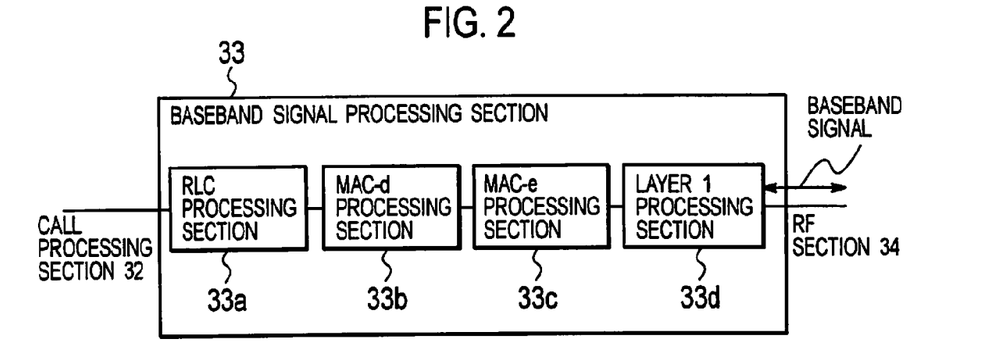
FIG. 2 is a functional block diagram of a baseband signal processing section in a mobile station of the mobile communication system according to the first embodiment of the present invention.

As shown in FIG. 2, the baseband signal processing section 33 is provided with an RLC processing section 33$a$, a MAC-d processing section 33$b$, a MAC-e processing section 33$c$, and a layer-1 processing section 33$d$.

The RLC processing section 33$a$ is configured to perform a processing (RLC processing) of an upper layer of a layer-2, against user data transmitted from the call processing section 32 so as to transmit the user data to the MAC-d processing section 33$b$.

The MAC-d processing section 33$b$ is configured to grant a channel identifier header based on a logical channel to which a data is originated, so as to generate a transmission format in the uplink.

Figure 3:
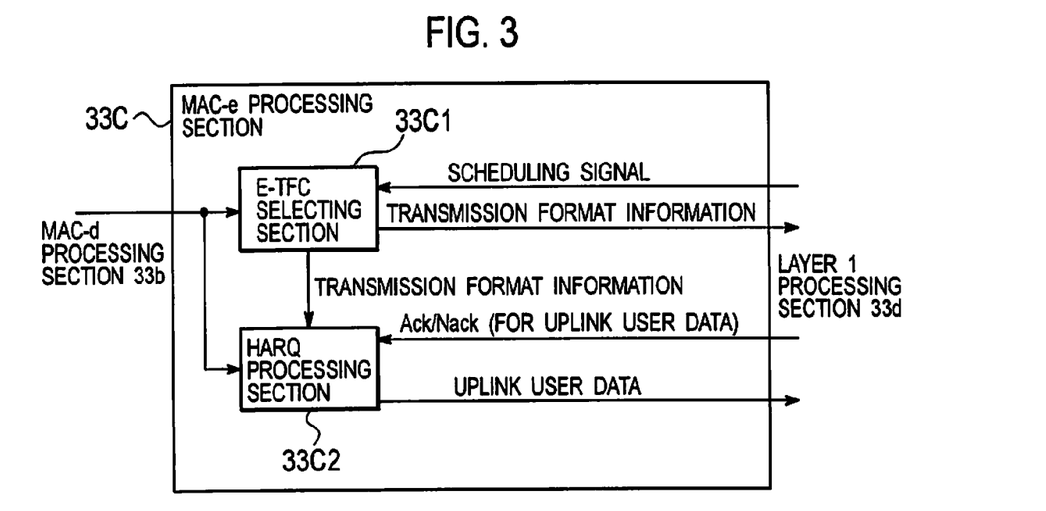
FIG. 3 is a functional block diagram of a MAC-e processing section of the baseband signal processing section in a mobile station of the mobile communication system according to the first embodiment of the present invention.

As shown in FIG. 3, the MAC-e processing section 33$c$ is provided with an Enhanced Transport Format Combination (E-TFC) selecting section 33$c$1 and an HARQ processing section 33$c$2.

The E-TFC selecting section 33$c$1 is configured to determine a transmission format (E-TFC) of the E-DPDCH based on scheduling signals transmitted from the radio base station Node B.

In addition, the E-TFC selecting section 33$c$1 is configured to transmit transmission format information on the determined transmission format (that is, a transmission data block size, a transmission power ratio between the E-DPDCH and the DPCCH, or the like) to the layer-1 processing section 33$d$, and to transmit the determined transmission format information to the HARQ processing section 33$c$2.

Here, the scheduling signals include such as absolute value of the maximum allowable transmission rate of user data at the mobile station UE, which is transmitted by the AGCH (for example, a maximum allowable transmission data block size, a maximum value of the transmission power ratio between the E-DPDCH and the DPCCH (maximum allowable transmission power ratio), or the like).

In this description, unless specified otherwise, it is assumed that the maximum allowable transmission rate includes a parameter related to the maximum allowable transmission rate.

Such scheduling signals are information that is notified in the cell where the mobile station UE is located, and include control information for all the mobile stations located in the cell, or a specific group of the mobile stations located in the cell.

The HARQ processing section 33c2 is configured to perform process control for the "stop-and-wait of N-process", so as to transmit the user data in the uplink based on the transmission acknowledgement signals (Ack/Nack for uplink data) transmitted from the radio base station Node B.

Specifically, the HARQ processing section 33c2 is configured to determine, based on the transmission acknowledgement signals (Ack/Nack for the uplink) transmitted from the radio base station Node B, whether or not the reception processing of the uplink user data at the radio base station Node B has been successful.

When the transmission acknowledgement signal transmitted from the radio base station Node B to the HARQ processing is "Ack" (reception processing of uplink user data has been successful), the HARQ processing section 33c2 is configured to transmit new uplink user data at the HARQ processing.

Further, when the transmission acknowledgement signal transmitted from the radio base station Node B to the HARQ processing is "NACK" (reception processing of uplink user data has not been successful), the HARQ processing section 33c2 is configured to retransmit the uplink user data at the HARQ processing.

In addition, even when uplink user data to be transmitted does not exist, the HARQ processing section 33c2 is configured to transmit transmission data blocks including outer loop transmission power control signals (MAC layer control information) in accordance with a transmission period notified from the radio network controller RNC (a predetermined transmission period) when the HARQ processing section 33c2 has not transmitted uplink user data for a predetermined period.

It is assumed that the outer loop transmission power control signals include such as a status of the mobile station UE (for example, availability of the transmission power, a status of a transmission buffer, or the like) or a CRC bit, or the like. Further, padding processing is performed against the transmission data blocks including the outer loop transmission power control signals, until the transmission data block reaches its minimum size.

For example, the above-described transmission period is notified from the radio network controller RNC by such as an RRC message or the like, when the mobile station UE sets a call or when the mobile station UE starts a soft handover.

Figure 4:
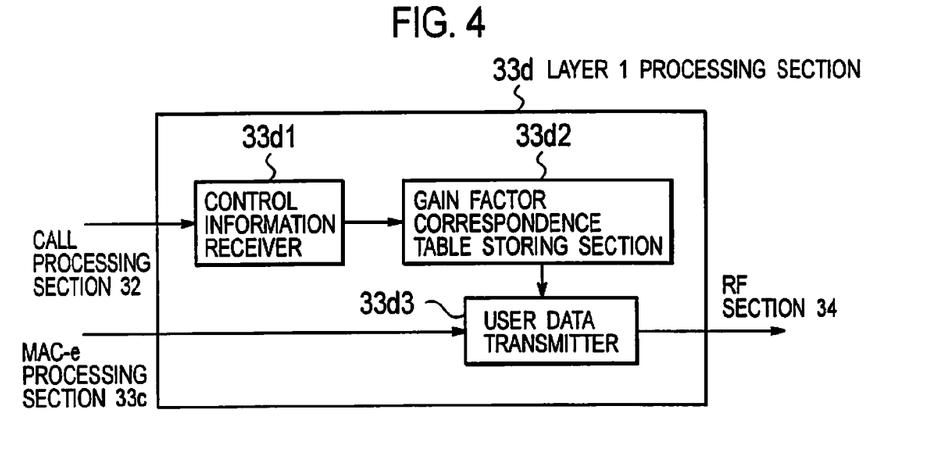
FIG. 4 is a functional block diagram of a layer-1 processing section of the baseband signal processing section in a mobile station of the mobile communication system according to the first embodiment of the present invention.

As shown in FIG. 4, the layer-1 processing section 33d includes a control information receiver 33d1, a gain factor correspondence table storing section 33d2, and a user data transmitter 33d3.

The control information receiver 33d1 is configured to receive control information relating the layer 1 and the layer 2, from the radio network controller RNC through the call processing section 33d1.

The gain factor correspondence table storing section 33d2 is configured to extract, from the layer 2 related control information received at the control information receiver 33d1, a correspondence table showing correspondence between a transmission data block size of uplink user data and an EDCH transmission power ratio relating to the uplink user data, so as to store the extracted correspondence table.

In addition, the user data transmitter 33d8 is configured to transmit the uplink user data by using a transmission power ratio (transmission rate) determined by using the correspondence table, the correspondence table stored in the gain factor correspondence table storing section 33d2 and showing correspondence between the transmission data block size and the EDCH transmission power ratio.

In addition, the user data transmitter 33d8 is configured to transmit the transmission data blocks including outer loop transmission power control signals (MAC layer control information) by using the above transmission power ratio.

Figure 5:
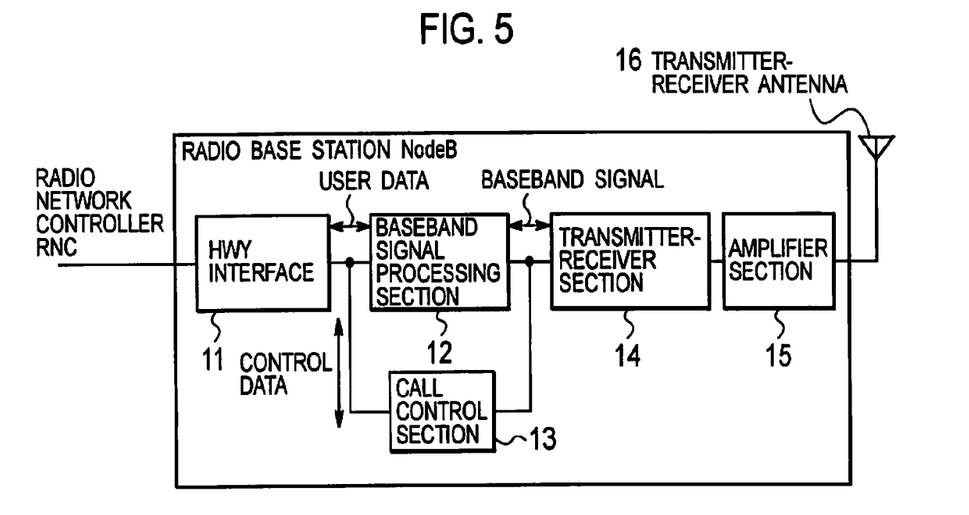
FIG. 5 is a functional block diagram of a radio base station of the mobile communication system according to the first embodiment of the present invention.

As shown in FIG. 5, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE through a downlink, so as to enter the user data to the baseband signal processing section 12. In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, user data included in the uplink signals which are received from a mobile station UE through an uplink, so as to transmit the acquired user data to the radio network controller RNC. Further, the HWY interface 11 is configured to acquire control data for the radio network controller RNC from the call control section 13, so as to transmit the acquired control data to the radio network controller RNC.

The baseband signal processing section 12 is configured to generate baseband signals by performing the MAC-e processing and the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like. In addition, the layer-1 processing in the downlink includes a channel coding processing of user data, a spreading processing, or the like.

In addition, the baseband signal processing section 12 is configured to extract user data by performing the layer-1 processing and the MAC-e processing against the baseband signals acquired from the transmitter-receiver section 14, so as to forward the extracted user data to the HWY interface 11.

Here, the MAC-e processing in the uplink includes an HARQ processing, a scheduling processing, a transmission rate control processing, a header disposal processing, or the like. In addition, the layer-1 processing in the uplink includes the despreading processing, the RAKE combining processing, an error correction decode processing, or the like.

Detailed description of the functions of the baseband signal processing section 12 will be given later. In addition, the call control section 13 is configured to perform a call control processing based on the control data acquired from the HWY interface 11.

The transmitter-receiver section 14 is configured to perform processing of converting baseband signals acquired from the baseband signal processing section 12, into radio frequency signals (downlink signals), so as to transmit the converted radio frequency signals to the amplifier section 15. In addition, the transmitter-receiver 14 is configured to perform processing of converting the radio frequency signals (uplink signals) acquired from the amplifier section 15, into the baseband signals, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE through the transmission-reception antenna 16. In addition, the amplifier 15 is configured to amplify the uplink signals received by the transmission-reception antenna 16, so as to transmit the amplified uplink signals to the transmitter-receiver section 14.

Figure 6:
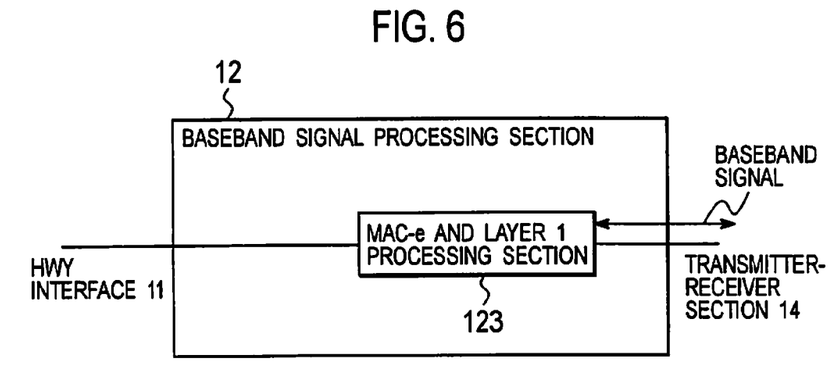
FIG. 6 is a functional block diagram of a baseband signal processing section in a radio base station of the mobile communication system according to the first embodiment of the present invention.

As shown in FIG. 6, the baseband signal processing section 12 is provided with a MAC-e and layer-1 processing section 123.

The MAC-e and layer-1 processing section 123 is configured to perform, against the baseband signals acquired from the transmitter-receiver section 14, the despreading processing, a RAKE combining processing, an error correction decode processing, an HARQ processing, or the like.

However, these functions are not clearly divided per hardware, and can be acquired by software.

Figure 7:
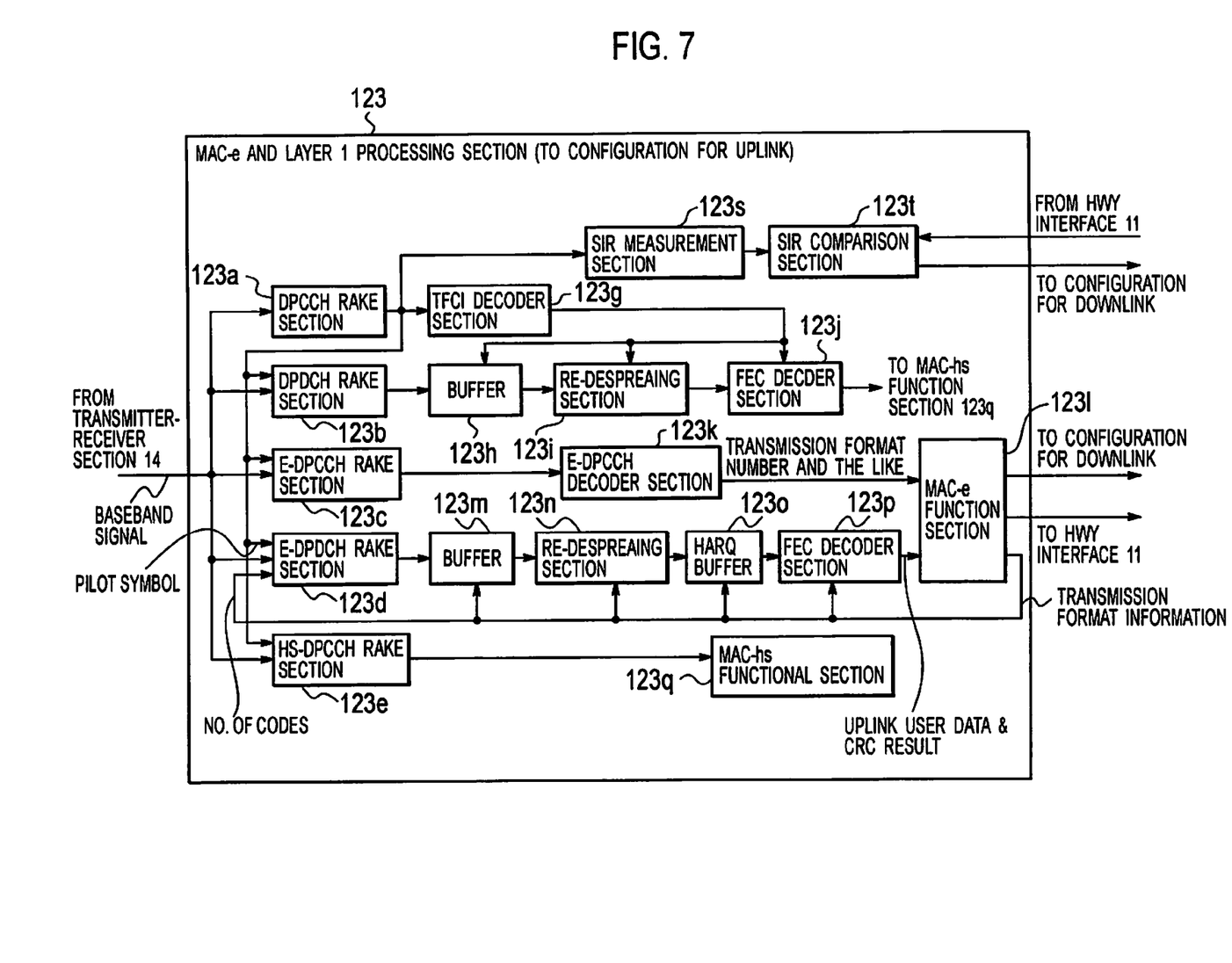
FIG. 7 is a functional block diagram of a MAC-e and layer-1 processing section (configuration for uplink), of the baseband signal processing section in a radio base station of the mobile communication system according to the first embodiment of the present invention.

As shown in FIG. 7, the MAC-e and layer-1 processing section (configuration for the uplink) 123 is provided with a DPCCH RAKE section 123*a*, a DPDCH RAKE section 123*b*, an E-DPCCH RAKE section 123*c*, an E-DPDCH RAKE section 123*d*, an HS-DPCCH RAKE section 123*e*, a Transport Format Combination Indicator (TFCI) decoder section 123*g*, buffers 123*h* and 123*m*, re-despreading sections 123*i* and 123*n*, FEC decoder sections 123*j* and 123*p*, an E-DPCCH decoder section 123*k*, a MAC-e functional section 123*l*, an HARQ buffer 123*o*, a MAC-hs functional section 123*q*, an SIR measurement section 123*s*, and an SIR comparison section 123*t*.

The E-DPCCH RAKE section 123*c* is configured to perform, against the E-DPCCH in the baseband signals transmitted from the transmitter-receiver section 14, the despreading processing and the RAKE combining processing using a pilot symbol included in the DPCCH.

The E-DPCCH decoder section 123*k* is configured to acquire transmission format number related information, HARQ related information, scheduling related information, or the like, by performing the decode processing against the RAKE combining outputs of the E-DPCCH RAKE section 123*c*, so as to enter the information to the MAC-e functional section 123*l*.

The E-DPDCH RAKE section 123*d* is configured to perform, against the E-DPDCH in the baseband signals transmitted from the transmitter-receiver section 14, the despreading processing using the transmission format information (the number of codes) transmitted from the MAC-e functional section 123*l* and the RAKE combining processing using the pilot symbol included in the DPCCH.

The buffer 123*m* is configured to store the RAKE combining outputs of the E-DPDCH RAKE section 123*d* based on the transmission format information (the number of symbols) transmitted from the MAC-e functional section 123*l*.

The re-despreading section 123*n* is configured to perform the despreading processing against the RAKE combining outputs of the E-DPDCH RAKE section 123*d* stored in the buffer 123*m*, based on the transmission format information (spreading factor) transmitted from the MAC-e functional section 123*l*.

The HARQ buffer 123*o* is configured to store the despreading processing outputs of the re-despreading section 123*n*, based on the transmission format information transmitted from the MAC-e functional section 123*l*.

The FEC decoder section 123*p* is configured to perform an error correction decoding processing (the FEC decoding processing) against the despreading processing outputs of the re-despreading section 123*n*, which is stored in the HARQ buffer 123*o*, based on the transmission format information (transmission data block size) transmitted from the MAC-e functional section 123*l*.

The MAC-e functional section 123*l* is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123*k*.

The SIR measurement section 123*s* is configured to measure a reception SIR by using the pilot portion included in the DPCCH.

The SIR comparison section 123*t* is configured to compare a target SIR notified from the radio network controller RNC through the HWY interface 11, with the measured reception SIR. Then, based on the comparison result, the SIR comparison section 123*t* instructs the downlink configuration of the baseband signal processing section 12 to transmit a "Down" command or an "Up" command through the downlink.

Figure 8:
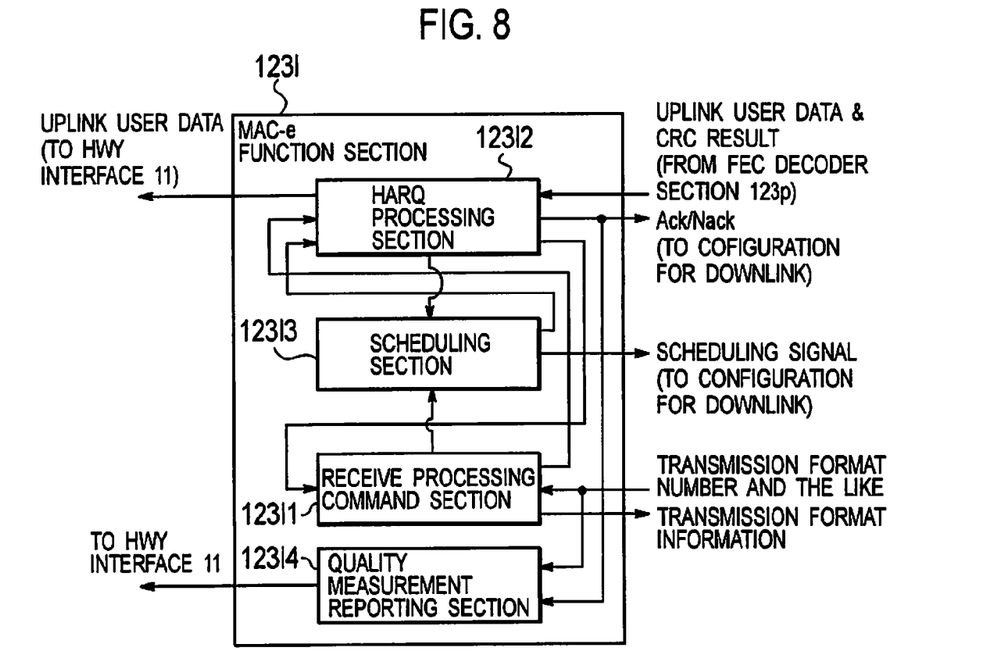
FIG. 8 is a functional block diagram of a MAC-e functional section of the MAC-e and layer-1 processing section (configuration for uplink), of the baseband signal processing section in a radio base station of the mobile communication system according to the first embodiment of the present invention.

In addition, as shown in FIG. 8, the MAC-e functional section 123*l* is provided with a receive processing command section 123*l*/1, an HARQ processing section 123*l*/2, and a scheduling section 123*l*/3.

The receive processing command section 123*l*/1 is configured to transmit the transmission format number related information, the HARQ related information, and the scheduling related information, which are entered from the E-DPCCH decoder section 123*k*, to the HARQ processing section 123*l*/2.

In addition, the receive processing command section 123*l*/1 is configured to transmit, to the scheduling section 123*l*/3, the scheduling related information entered from the E-DPCCH decoder section 123*k*.

Further, the receive processing command section 123*l*/1 is configured to output the transmission format information corresponding to the transmission format number entered from the E-DPCCH decoder section 123*k*.

The HARQ processing section 123*l*/2 is configured to determine whether or not the receive processing of uplink user data has been successful, based on the CRC result entered from the FEC decoder section 123*p*.

Then, the HARQ processing section 123*l*/2 is configured to generate the transmission acknowledgement signals (Ack or Nack), based on the determination result, so as to transmit the generated transmission acknowledgement signals to the configuration for the downlink of the baseband signal processing section 12.

In addition, the HARQ processing section 123*l*/2 is configured to transmit the uplink user data entered from the FEC decoder section 123*p* to the radio network controller RNC, when the above determination result has been "OK".

In addition, the HARQ processing section 123*l*/2 is configured to clear soft decision information stored in the HARQ buffer 123*o*, when the above determination result has been "OK".

On the other hand, the HARQ processing section 123*l*/2 is configured to store, in the HARQ buffer 123*o*, the uplink user data, when the above determination result has been "NG".

In addition, the HARQ processing section 123/2 is configured to forward the above determination result to the receive processing command section 123/1.

The receive processing control command section 123/1 is configured to notify the E-DPDCH RAKE section 123d and the buffer 123m of an hardware resource to be prepared for the following transmission time interval (TTI), so as to perform notification for reserving the resource in the HARQ buffer 123o.

In addition, when the uplink user data is stored in the buffer 123m, the receive processing command section 123/1 is configured to instruct the HARQ buffer 123o and the FEC decoder section 123p to perform the FEC decoding processing after adding the uplink user data, which is stored in the HARQ buffer 123o, in a process corresponding to the TTI and a newly received uplink user data, per TTI.

In addition, the scheduling section 123/3 is configured to instruct the configuration for the downlink of the baseband signal processing section 12 to notify the scheduling signals including the maximum allowable transmission rate (maximum allowable transmission data block size, maximum allowable transmission power ratio, or the like), based on radio resources in the uplink of the radio base station Node B, interference volume (noise rise) in the uplink, or the like.

To be more specific, the scheduling section 123/3 is configured to determine the maximum allowable transmission rate based on scheduling related information (radio resource in the uplink) transmitted from the E-DPCCH decoder section 123k so as to control the transmission rate of user data of the mobile station in communication.

Detailed descriptions of a control method based on the hardware resources and a control method based on the interference volume in the uplink will be given below.

In the control method based on the hardware resources, the scheduling section 123/3 is configured to notify the maximum allowable transmission rate through the AGCH to the mobile station UE connected to a cell under the control of the radio base station Node B.

When the transmission rate of user data in the mobile station UE connected to the cell under the control of the radio base station Node B increases and the hardware resources becomes insufficient, the scheduling section 123/3 lowers the maximum allowable transmission rate so that shortage of the hardware resources will not be caused.

On the other hand, when the hardware resources have spaces in such a case when the user data transmission in the mobile station UE connected to the cell under the control of the radio base station Node B is completed, or the like, the scheduling section 123/3 again increases the maximum allowable transmission rate.

In addition, in the control method based on the interference volume in the uplink, the scheduling section 123/3 is configured to notify the maximum allowable transmission rate through the AGCH to the mobile station UE connected to the cell under the control of the radio base station Node B.

When the transmission rate of user data in the mobile station UE connected to the cell under the control of the radio base station Node B increases and the interference volume (for example, the noise rise) in the uplink exceeds an allowable value (for example, the maximum allowable noise rise), the scheduling section 123/3 lowers the maximum allowable transmission rate so that the interference volume in the uplink can fall within a range of the allowable value (see, FIG. 12).

On the other hand, when the interference volume (for example, the noise rise) in the uplink falls within the range of the allowable value (for example, the maximum allowable noise rise) and there is a space therein in the case when the user data transmission in the mobile station UE connected to the cell under the control of the radio base station Node B is completed, or the like, the scheduling section 123/3 again increases the maximum allowable transmission rate (see, FIG. 12).

The scheduling section 123/3 is configured to determine priority class for each logical channel used for transmitting uplink user data at the mobile station UE. Then, the scheduling section 123/3 determines an absolute value of maximum allowable transmission rate of uplink user data for each priority class, so as to transmit scheduling signals to the downlink configuration of the baseband signal processing section 12. The scheduling signals include the absolute value of maximum allowable transmission rate for each priority class, and a priority class ID for identifying the priority class.

The radio network controller RNC according to the present embodiment is an apparatus located on upper level of the radio base station Node B and configured to control radio communication between the radio base station Node B and the mobile station UE.

Figure 9:
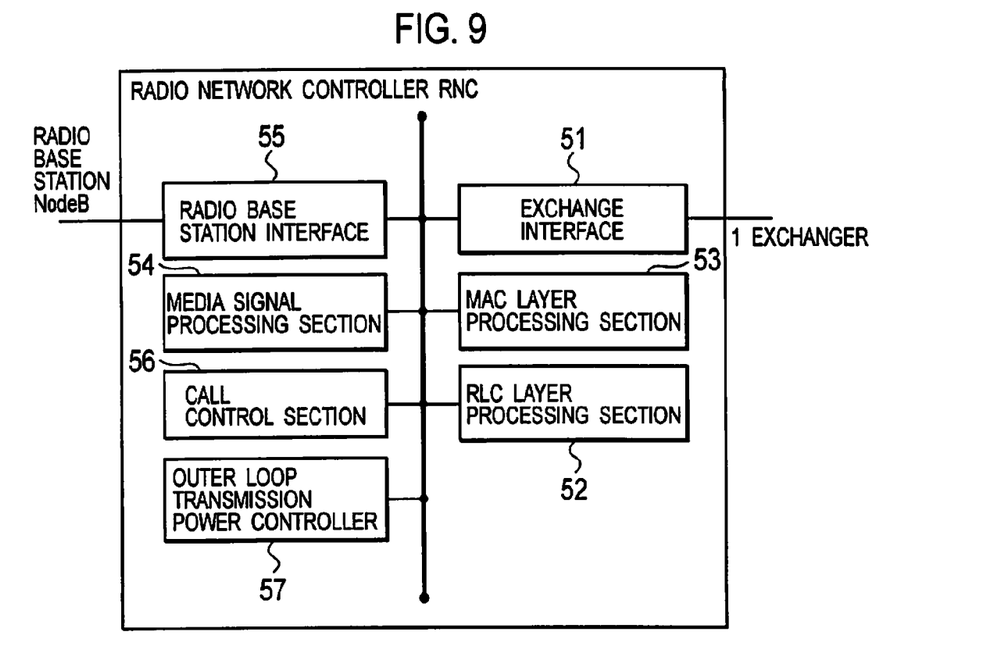
FIG. 9 is a functional block diagram of a radio network controller of the mobile communication system according to the first embodiment of the present invention.

As shown in FIG. 9, the radio network controller RNC according to this embodiment is provided with an exchange interface 51, a Radio Link Control (RLC) layer processing section 52, a MAC layer processing section 53, a media signal processing section 54, a radio base station interface 55, a call control section 56, and an outer loop transmission power controller 57.

The exchange interface 51 is an interface with an exchange 1. The exchange interface 51 is configured to forward the downlink signals transmitted from the exchange 1 to the RLC layer processing section 52, and to forward the uplink signals transmitted from the RLC layer processing section 52 to the exchange 1.

The RLC layer processing section 52 is configured to perform an RLC (Radio Link Control) sub-layer processing such as a synthesis processing of a header (e.g. a sequence number), a trailer, or the like.

The RLC layer processing section 52 is also configured to transmit the uplink signals to the exchange interface 51 and to transmit the downlink signals to the MAC layer processing section 53, after the RLC sub-layer processing is performed.

The MAC layer processing section 53 is configured to perform a MAC layer processing such as a priority control processing or a header granting processing.

The MAC layer processing section 53 is also configured to transmit the uplink signals to the RLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and open processing by the layer-3 signaling, or the like. Here, the radio resource control processing includes a call admission control processing, a handover processing, or the like.

The outer loop transmission power controller 57 is configured to determine transmission period of the outer loop transmission power control signals so as to notify the determined transmission period to the mobile station UE.

For example, the outer loop transmission power controller 57 is configured to determine a transmission period of the outer loop transmission power control signal, based on a status of the mobile station UE (whether or not the mobile station UE is in soft handover status, or the like) or a congestion degree in the uplink (radio network), and to notify the determined transmission period to the mobile station UE.

Further, the outer loop transmission power controller 57 may determine the above-described transmission period when the mobile station UE sets a call (E-DCH) or when the mobile station UE starts a soft handover, and notify the determined transmission period to the mobile station UE.

In addition, the outer loop transmission power controller 57 may determine a transmission power offset (a transmission power ratio between the E-DPDCH and the DPCCH or a gain factor) of the E-DPDCH (uplink user data channel) based on the measurement result of the reception quality of the outer loop transmission power control signal (for example, the reception SIR) received through the "E-DPDCH (uplink user data channel)" notified from the radio base station Node B, so as to notify the determined transmission power offset to the mobile station UE.

In addition, the outer loop transmission power controller 57 is configured to determine a target reception quality of the uplink user data channel (target SIR) based on the above-described measurement result, so as to notify the determination result to the radio base station Node B.

For example, the outer loop transmission power controller 57 determines the target SIR or the gain factor based on the uplink user data received from the radio base station Node B, a CRC result, a number of retransmissions, or the like.

In other words, when the CRC result is "NG" and the number of retransmission is large, the outer loop transmission power controller 57 either instructs the radio base station Node B to set the target SIR high, or instructs the radio base station Node B and the mobile station UE to set the gain factor high.

In addition, the outer loop transmission power controller 57 may use an RRC message so as to notify the above-described transmission period, target SIR, and transmission power offset, to the mobile station UE or to the radio base station Node B.

Thus, the mobile communication system according to this embodiment can prevent deterioration in the network capacity caused by the outer loop transmission power control signal, when the outer loop transmission power control signal is transmitted in a too short transmission period.

In addition, the mobile communication system according to this embodiment can prevent deterioration in the radio quality caused by deterioration in accuracy of the outer loop transmission power control signal, when the outer loop transmission power control signal is transmitted in a too long transmission period.

Modified Example 1

The present invention is not limited to the above embodiment, and various modifications can be applied to the present invention.

According to the mobile communication system of the modified example 1, the above-described "function of determining transmission period of the outer loop transmission power control signals and notifying the determined transmission period to the mobile station (transmission period determining section)" is performed at such as Operation & Maintenance Terminal (OMT) connected to the radio base station Node B, an upper node, or the like, instead of the radio network controller RNC.

Further, according to the mobile communication system of the modified example 1, the above-described "function of determining the transmission power offset (the transmission power ratio between the E-DPDCH and the DPCCH, or the gain factor) of the E-DPDCH (uplink user data channel) based on the measurement result of the reception quality of the outer loop transmission power control signal (reception SIR) received through the E-DPDCH (uplink user data channel) notified from the radio base station Node B, and the function of notifying the determined transmission power offset to the mobile station UE (transmission power offset determining section)" is also performed at such as the above-described OMT, the upper node, or the like.

In addition, the mobile communication system according to the modified example 1, the above-described "function of determining a target reception quality of the uplink user data channel based on the measurement result (target reception quality determining section)" is performed at the above-described OMT, the upper node, or the like.

Although the present invention has been described in detail above with the embodiment, it is apparent to those skilled in the art that the present invention is not limited to the embodiment described in the present application. The present invention can be implemented as altered and modified embodiments without departing from the spirit and scope of the present invention as defined by the description of claims. Therefore, the description of the present application is for illustrative purposes and is not intended to limit the present invention in any way.

INDUSTRIAL APPLICABILITY

As described above, the present invention can provide a transmission power control method and a mobile station that makes it possible to avoid deterioration in the radio quality caused by the transmission interruption of uplink user data, by periodically controlling an outer loop transmission power.

The invention claimed is:
1. A transmission power control method for controlling a transmission power of an uplink user data channel at a mobile station, comprising:
   determining a transmission period of an outer loop transmission power control signal and notifying the determined transmission period to the mobile station;
   transmitting, at the mobile station, the outer loop transmission power control signal in the determined transmission period through the uplink user data channel, even when uplink user data to be transmitted through the uplink user data channel does not exist;
   measuring, at a radio base station, a reception quality of the outer loop transmission power control signal received through the uplink user data channel;
   controlling, at the radio base station, the transmission power of the uplink user data channel based on the measurement result and a target reception quality;
   notifying, at the radio base station, the measurement result to a radio network controller;

determining, at the radio network controller, a transmission power offset of the uplink user data channel based on the measurement result, and notifying the determined transmission power offset to the mobile station;

determining, at the radio network controller, the target reception quality based on the measurement result, and notifying the determined target reception quality to the radio base station; and controlling, at the mobile station, the transmission power of the uplink user data channel by using the transmission power offset, wherein the uplink user data channel does not primarily transmit control signals; and wherein the transmission period is determined in accordance with a status of the mobile station or a congestion degree of a radio network.

2. The transmission power control method according to claim 1, wherein the radio network controller determines the transmission period and notifies the determined transmission period to the mobile station.

3. The transmission power control method according to claim 1, wherein the radio network controller determines the transmission period when the mobile station sets a call or when the mobile station starts a soft handover, and notifies the determined transmission period to the mobile station.

4. A mobile station for transmitting an uplink user data channel, comprising:

an outer loop transmission power control signal transmitter configured to transmit an outer loop transmission power control signal through the uplink user data channel at a predetermined transmission period, even when uplink user data to be transmitted through the uplink user data channel does not exist, wherein the transmission period is determined in accordance with a status of a mobile station or a congestion degree of a radio network; and a transmission power controller configured to control a transmission power of the uplink user data channel by using a transmission power offset determined by using the outer loop transmission power control signal, wherein the uplink user data channel does not primarily transmit control signals.

5. The mobile station according to claim 4, wherein the predetermined transmission period is determined by a radio network controller and notified.

6. The mobile station according to claim 4, wherein the predetermined transmission period is notified when the mobile station sets a call or when the mobile station starts a soft handover.

7. A radio network controller used in a transmission power control method for controlling a transmission power of an uplink user data channel at a mobile station, comprising:

a transmission period determining section configured to determine a transmission period for an outer loop transmission power control signal and to notify the determined transmission period to the mobile station;

a transmission power offset determining section configured to determine a transmission power offset of the uplink user data channel based on the measurement result of a reception quality of the outer loop transmission power control signal received through the uplink user data channel, the measurement result notified from a radio base station, and to notify the determined transmission power offset to the mobile station; and a target reception quality determining section configured to determine a target reception quality of the uplink user data channel based on the measurement result, and to notify the determined target reception quality to the radio base station, wherein the uplink user data channel does not primarily transmit control signals; and wherein the transmission period determining section is configured to determine the transmission period in accordance with a status of the mobile station or a congestion degree of a radio network, and to notify the determined transmission period to the mobile station.

8. The radio network controller according to claim 7, wherein the transmission period determining section is configured to determine the transmission period when the mobile station sets a call or when the mobile station starts a soft handover, and to notify the determined transmission period to the mobile station.

* * * * *